United States Patent
Byrnes et al.

(10) Patent No.: US 11,092,427 B2
(45) Date of Patent: Aug. 17, 2021

(54) METROLOGY AND PROFILOMETRY USING LIGHT FIELD GENERATOR

(71) Applicant: The Charles Stark Draper Laboratory, Inc., Cambridge, MA (US)

(72) Inventors: Steven J. Byrnes, Watertown, MA (US); Jeffrey A. Korn, Lexington, MA (US); Gregg E. Favalora, Bedford, MA (US); Juha-Pekka J. Laine, Boston, MA (US); Michael G. Moebius, Somerville, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 108 days.

(21) Appl. No.: 16/141,418

(22) Filed: Sep. 25, 2018

(65) Prior Publication Data
US 2020/0096315 A1    Mar. 26, 2020

(51) Int. Cl.
*G01B 9/02*  (2006.01)
*G01B 11/24*  (2006.01)

(52) U.S. Cl.
CPC ..... *G01B 9/02098* (2013.01); *G01B 9/02022* (2013.01); *G01B 11/2441* (2013.01)

(58) Field of Classification Search
CPC ............ G01B 9/02022; G01B 9/02098; G01B 11/2441
See application file for complete search history.

(56) References Cited

U.S. PATENT DOCUMENTS

| 1,128,979 A | 2/1915 | Hess |
| 6,069,650 A | 5/2000 | Battersby |
| 2006/0256436 A1 | 11/2006 | Javidi |
| 2007/0127932 A1* | 6/2007 | Qi ..................... H04B 10/5561 398/188 |
| 2009/0002716 A1* | 1/2009 | Nolte ................. G01N 21/4788 356/511 |

(Continued)

FOREIGN PATENT DOCUMENTS

WO    WO-2018140938 A1 *  8/2018  ........... G03H 1/2294

OTHER PUBLICATIONS

Falaggis, K., et al., "Absolute Metrology by Phase and Frequency Modulation for Multiwavelength Interferometry," Optic Letters, 36(15): 2928-2930 (2011).

(Continued)

*Primary Examiner* — Michael A Lyons
(74) *Attorney, Agent, or Firm* — HoustonHogle LLP

(57) ABSTRACT

A system and method for metrology and profilometry using a light field generator are disclosed. For this purpose, a system such as an optical analysis system scans a sample using light, and detects light reflected off a sample in various ways. The system operates different operational modes including a backscatter intensity, a triangulation, and an interferometric mode. For this purpose, the optical analysis system includes one or more optical angle modulation systems, such as surface acoustic wave (SAW) modulators, that emit light, a sample holder, and a scanning system that scans the one or more SAW modulators relative to the sample holder. The system performs tomographic reconstructions of information generated by the scans to create 3D maps/volume datasets of the sample.

10 Claims, 6 Drawing Sheets

(56) References Cited

U.S. PATENT DOCUMENTS

2013/0088723 A1* 4/2013 Feldkhun ........... G01B 9/02041
356/498
2014/0300694 A1* 10/2014 Smalley ................ G02F 1/011
348/40

OTHER PUBLICATIONS

Abruna, E., "Multiwavelength-Interferometry-Based Sensor Redefines Precision Position Metrology," Laser Focus World, 1-7 (2017).
DeFisher, S., et al., "New Advancements in Freeform Optical Metrology," Proc. SPIE, 10179, 1017909-1-101790P-7 (2017).
Geng, J. "Structured-Light 3D Surface Imaging: A Tutorial," Advances in Optics and Photonics, 3: 128-160 (2011).
Geng, J., "Three-Dimensional Display Technologies," Advances in Optics and Photonics, 5: 456-535 (2013).
Halle, M., "Autosteroscopic Displays and Computer Graphics," Computer Graphics, 31(2): 58-62 (1997).
Jiang, C., et al., "Three-Dimensional Shape Measurement Using a Structured Light System with Dual Projectors," Applied Optics, 57(14): 3983-3990 (2018).
Liu, Z, et al., "Motion-Induced Error Compensation for Phase Shifting Profilometry," Optics Express, 26(10): 12632-12637 (2018).
Smalley, D.E., et al., "Anisotropic Leaky-Mode Modulator for Holographic Video Displays," Nature, 498: 313-318 (2013).
Zhang, S., et al., "Sinusoidal Phase Modulating Absolute Distance Measurement Interferometer Combining Frequency-Sweeping and Multi-Wavelength Interferometry," Optics Express, 26(7): 9273-9284 (2018).

* cited by examiner

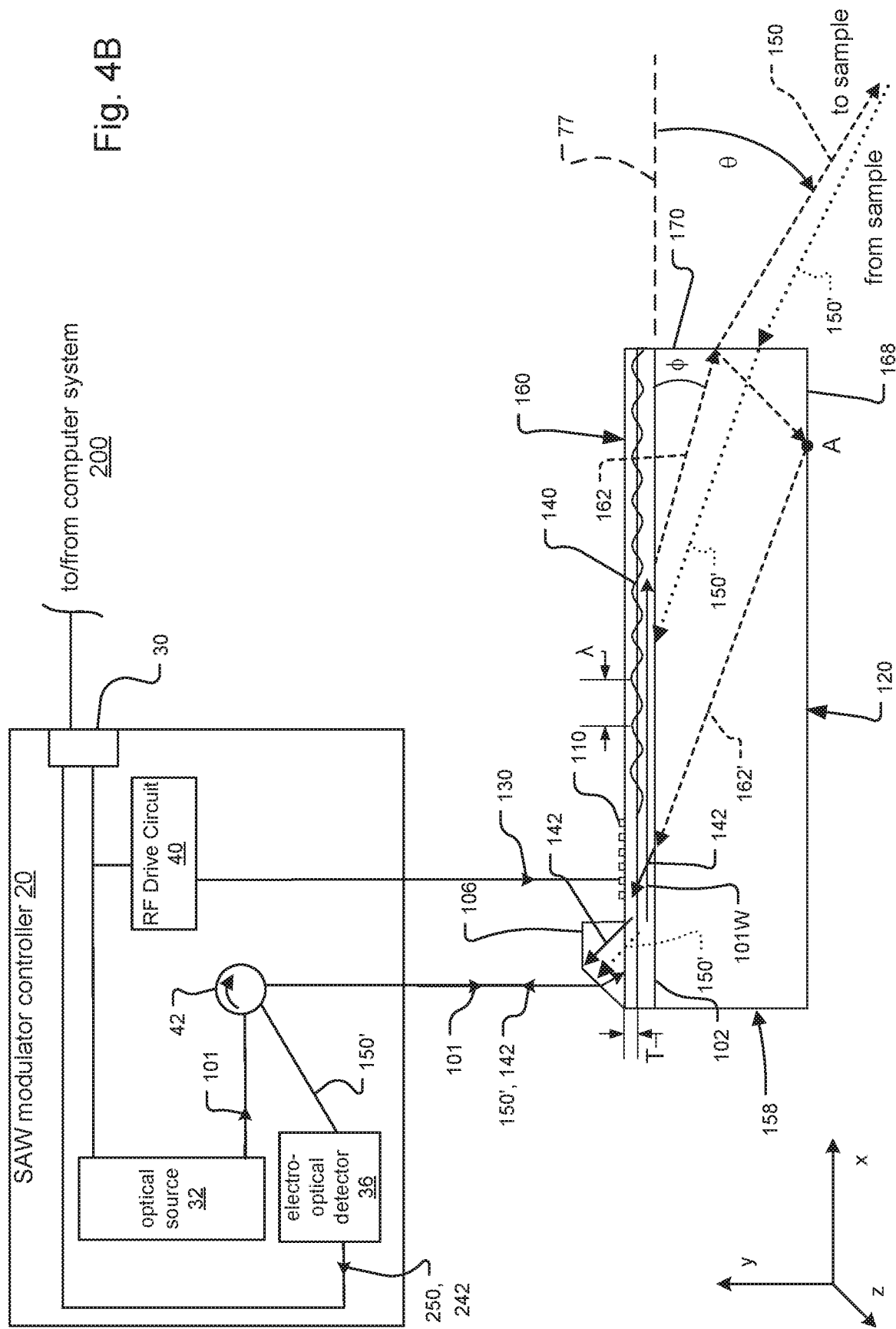

METROLOGY AND PROFILOMETRY USING LIGHT FIELD GENERATOR

BACKGROUND OF THE INVENTION

Optical analysis systems, such as metrology systems, use light to analyze samples. These systems can provide non-destructive, non-contact scanning of the samples. One example of these systems is an optical profilometry system that uses light to measure surface features of the sample such as to quantify its roughness.

The optical profilometry systems are generally divided into two types, structured light type and interferometric. In the structured light type, light is projected onto a sample, and light diffusely reflected from the sample is detected by a camera and captured as images. The images are then analyzed to infer the surface features of the sample. The interferometric type, in contrast, is typically based upon a Mirau interferometer.

SUMMARY OF THE INVENTION

The existing optical profilometry systems have limitations. In one example, these systems in general have difficulty obtaining accurate surface measurements for areas of the surfaces having sharp curvature, sharp edges, or hard-to-access internal surfaces. This measurement inaccuracy is due to the fact that these systems typically direct light at a fixed angle relative to the surface throughout the scan. If the surface has sharp edges or curves in some areas, less light is reflected back from the sample in these areas as compared to smooth areas. Thus, less information is provided to the system for analysis. In another example, the interferometric type of these systems can experience measurement ambiguities when using input light of a narrow bandwidth, or limited sensing range when using input light of a broad bandwidth.

There are different ways of overcoming the limitations of the existing optical profilometry systems. To overcome the inaccuracies associated with scanning surfaces of samples having sharp edge or curves, multiple scans are typically executed. Each scan directs light at a different angle relative to the samples, and the 3D maps generated from each of the scans are then "stitched" together. However, this process is time-consuming and often inaccurate. To overcome the measurement ambiguities associated with the narrow-band interferometric type, several approaches are typically used. One approach uses a moving reference mirror within the interferometer. In another approach, the input light is modulated in phase or frequency.

On the other hand, autostereoscopic display systems and acousto optic modulators (AOMs) have been known for decades. The term autostereoscopic display system refers to technologies from the field of autostereoscopic display, in which light can be emitted from one or more origins in one or more directions, such as spatially-multiplexed displays, including the parallax panoramagram variety. These systems, along with AOMs, can be used to create light field displays. Well-known examples of parallax panoramagrams include: lenticular displays, parallax barrier displays, integral imaging/integral photography displays, and directional illumination displays. These technologies use an optical array, such as one- or two-dimensional arrays of lenslets, opaque barriers, or other techniques in conjunction with a field of light-emitting regions having a pitch smaller than the pitch of the optical array. Lenticular display systems, in particular, include one and two dimensional arrays of lenses, designed so that when viewed from slightly different angles, different images will be seen. On the other hand, AOMs include a piezoelectric transducer for generating an acoustic wave in or on a crystal. Example crystals include tellurium dioxide ($TeO_2$), crystalline quartz, and fused silica. One more recent type of AOM is known as a surface acoustic wave (SAW) modulator, which typically uses lithium niobate ($LiNbO_3$) crystals. These modulators receive input light from a light source and radio frequency (RF) signals from an RF source. The RF signals "drive" or deflect the light to different angles.

The ability of these parallax panoramagrams and AOM to modulate the angles of emitted light relative to the sample can provide improvements over existing optical analysis systems. These light field display technologies can change the angle of the light to scan the light and cause more light to be reflected off areas of the sample having sharp edges, which can improve measurement accuracy.

These optical angle modulation systems, including parallax panoramagram display systems and various types of AOM modulators, can also be configured and/or fabricated to operate as interferometers.

These optical angle modulation systems can also be fabricated to have an integrated electro-optic phase shifter. As a result, input light of multiple wavelengths, frequency sweeping using a range of RF signals, and phase shifting can be incorporated into the same SAW modulator devices that provide angle scanning.

In general, according to one aspect, the invention features an optical analysis system. The system comprises an optical angle modulation system for scanning light over an object and a computer system for mapping the object.

The optical angle modulation system can take a number of forms. In one case, it comprises a parallax panoramagram display system such as a lenticular display, a parallax barrier display, an integral imaging/integral photography display, or a directional illumination display. In another case, it comprises one or more AOM, or specifically surface acoustic wave (SAW) modulators, that emit light.

The SAW modulators might utilize chirped RF pulses to focus the emitted light into spots upon or around a surface of the object.

A mechanical scanning system could be used that moves the optical angle modulation system relative to the object. It could include a rotation stage that carries the object, wherein the rotation stage rotates the object relative to the one or more SAW modulators. Translation of the optical angle modulation system vertically and horizontally with respect to the object is also possible.

The light reflected off the object can be coupled back into the optical angle modulation system and detected. In one example, the optical angle modulation system comprises one or more SAW modulators, each having a waveguide formed within a substrate, wherein the light coupled back into the SAW modulator is coupled into and then out of the waveguide by SAW waveforms within the waveguide, and then detected.

A camera can also be used to detect the light reflected by the object.

In one mode, light from a reference arm path is mixed with the light returning from the object to form interference signals, which are detected.

One or more optical elements, possibly at or near an exit face of the optical angle modulation system, are helpful. The elements can be diffractive and/or refractive and/or holographic and/or arrayed.

In general, according to another aspect, the invention features a method of operation for an optical analysis system. The method comprises scanning light from an optical angle modulation system over an object and detecting the light reflected by the sample.

In general, according to another aspect, the invention features a SAW-based interferometry system. This comprises a SAW modulator that receives input light, emits some of the light via an exit face, and reflects some of the light inward at the exit face to form a reference arm path, wherein the SAW modulator receives reflected light that is coupled back into the SAW modulator to form a sample arm path.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 4A and 4B are schematic diagrams that show different examples of SAW modulators for use in the interferometry mode of the system, where: FIG. 4A shows a reference notch fabricated within a substrate of the SAW modulator, and illustrates how the notch enables the SAW modulator to operate as an interferometer; and where FIG. 4B shows a specially adapted distal face of the SAW modulator that enables the SAW modulator to operate as an interferometer.

DETAILED DESCRIPTION OF THE PREFERRED EMBODIMENTS

Figure 1:
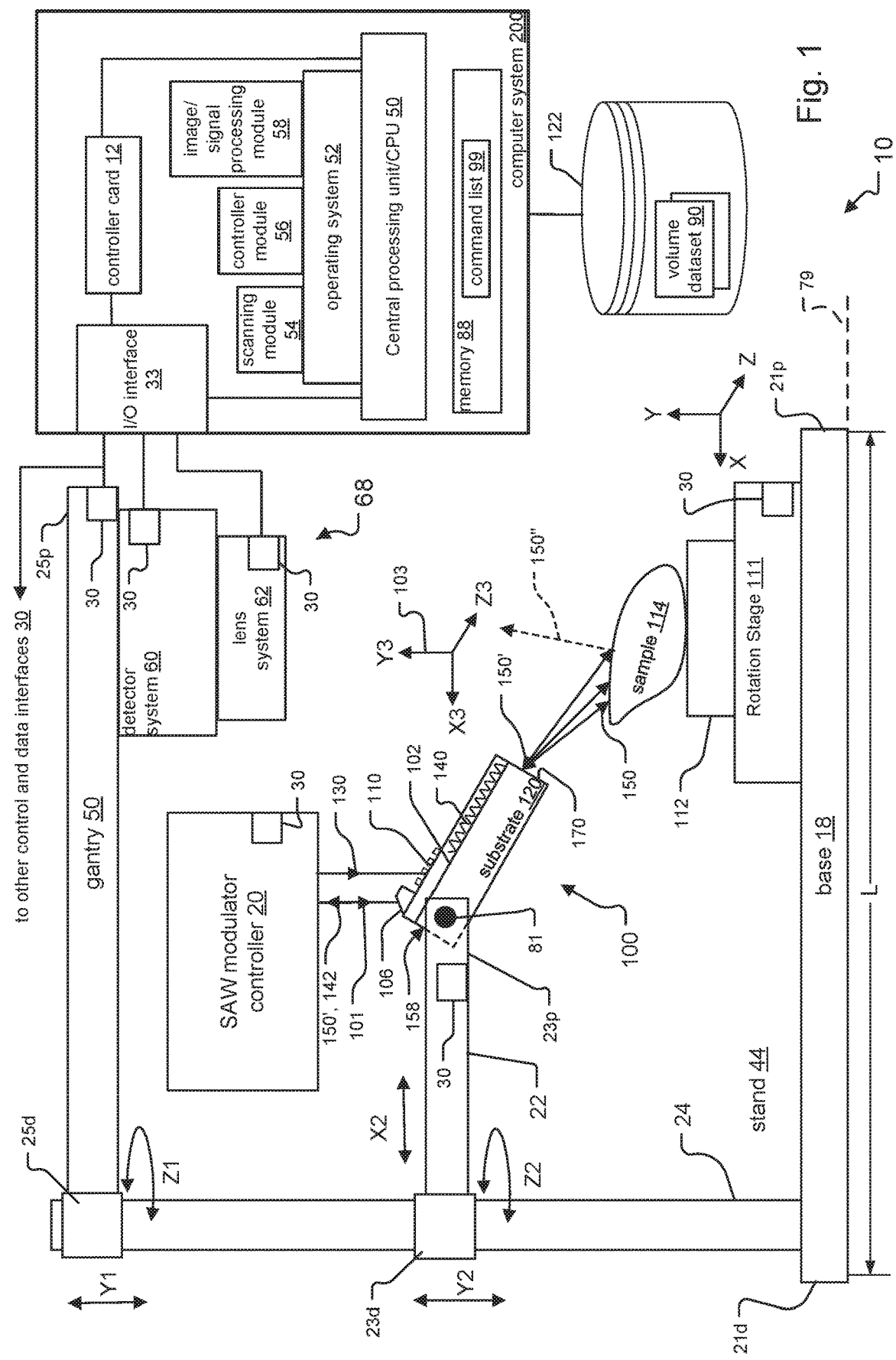
FIG. 1 is a schematic side view of an optical analysis system constructed in accordance with principles of the present invention, where the system has operational modes including a backscatter intensity mode, a triangulation mode, and an interferometry mode.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The proposed optical analysis system scans light from one or more optical angle modulation systems, such as SAW modulators, over a sample, such as an object, and detects the light reflected or otherwise modulated by the sample. It thus operates in the fashion of a light field display. The system scans the light using one or both of two scanning modalities: a mechanical scanning modality and a diffractive scanning modality. Generally, when scanning smaller objects, the system might rely entirely or mostly on the diffractive scanning modality. In contrast, for larger objects, the system might rely entirely, or mostly on the mechanical scanning modality. Typically, the scanning system will employ some combination of the mechanical scanning and diffractive scanning, however.

The mechanical scanning modality is characterized as physically moving the one or more optical angle modulation systems relative to the sample. This movement generally involves some combination of moving the modulators or moving the sample. For large objects, such as an automobile, the object might be entirely stationary, and a gantry holding the modulators might be moved over the sample. For smaller objects, possibly the modulators are stationary, and the sample is simply rotated in front of the modulators. And, there are other intermediate configurations that rely on combining modulator movement with sample movement and configurations that have no moving parts.

The diffractive scanning modality leverages the ability of the parallax panoramagram display systems and AOM modulators to "steer" (i.e. change angles of) the light emitted from the modulators. The frequency of the RF signals applied to the AOM modulators, for example, is controlled to change the angles of the emitted light relative to the sample and thus scan the light over the sample. Moreover, drive signals containing multiple frequencies and chirped frequency pulses can be used to create one or more beams and/or control the focus/divergence of those beams and possibly couple returning light back into the waveguide.

FIG. 1 is a schematic side view of an exemplary optical analysis system 10.

The system 10 includes various components. These components include one or more optical angle modulation systems, such as a parallax panoramagram display system or one or more AOMs. The illustrated example specifically has surface acoustic wave (SAW) modulators 100 that emit light and can create a light field, a sample holder 112, and a mechanical scanning system. The mechanical scanning system scans the one or more SAW modulators relative to the sample holder 112. In the illustrated example, only one modulator 100 is shown, but typically the substrate 120 would have multiple angle modulators, side-by-side, stretching into the plane of the figure, such as more than 10, or 50, or more AOM or SAW modulators 100.

Other components of the system 10 include a stand 44, a modulator controller 20, a camera 68, a computer system 200, and a database 122. In the illustrated example, the system 10 also has a rotation stage 111, which is part of the scanning system in this embodiment. The rotation stage 111 carries the sample holder 112. The sample holder 112 holds a sample 114.

The stand 44 has various structural elements. These structural elements include a base 18, a stand arm 22, a vertical support member 24 and a gantry 50.

The stand 44 is arranged as follows. The vertical support member 24 attaches to and rises upwards from a distal end 21d of the base 18. A distal end 23d of the support arm 22 is rotatably attached to the vertical support member 24 at a height above the base 18. A distal end 25d of the gantry 50 is rotatably attached to the vertical support member 24 at a height above the support arm 22. In this way, both the stand arm 22 and the gantry 50 are cantilevered above the base 18.

Some of the components are held by the stand 44. In the illustrated example, the rotation stage 111 is attached to the base 18 near a proximate end 21p of the base 18. The SAW modulator 100 is held on a proximate end 23p of the stand arm 22 above the sample 114. The camera 68 is held on a proximate end 25p of the gantry 50 above the sample 114.

The stand arm 22 and the gantry 50 can move/are adjustable in various directions to perform the functions of the scanning system in this embodiment. The gantry 50 can move in directions Y1 and Z1, while the stand arm 22 can move in directions X2, Y2, and Z2. Specifically, directions Z1 and Z2 respectively indicate rotation of the gantry 50 and the stand arm 22 along planes that are substantially parallel to a plane 79 of the base 18. Directions Y1 and Y2 respectively indicate movement of the gantry 50 and the stand arm 22 in height, along the vertical support member 24. Direction X2 indicates the ability of the stand arm 22 to move in a lateral direction, along a length L of the base 18.

The stand arm 22 and the gantry 50 are under control of the computer system 200. For this purpose, the stand arm 22 and the gantry 50 each include a control and data interface 30. This interface 30 enables the stand arm 22 and the gantry 50 to send information to and receive information from the computer system 200.

In one implementation, the stand arm 22 and the gantry 50 include motors such as servo motors. These motors enable movement of the stand arm 22 and the gantry 50 under control of the computer system 200. Here, the control and data interfaces 30 of the stand arm 22 and the gantry 50 receive control signals from the computer system 200. The interfaces 30 then translate the control signals to electrical signals for driving the motors.

The stand arm 22 also includes an actuator 81. In one example, the actuator is a 3D piezoelectric actuator. The actuator 81 is located at the proximate end 23p of the stand arm and has a positional coordinate system 103. To control the actuator 81, the control and interface 30 of the stand arm 22 accepts control signals/commands sent from the computer system 200. The interface 30 then translates the control signals/commands into electrical signals. The electrical signals drive the actuator 81 to positions along each of directions X3, Y3, and Z3 of the actuator's coordinate system 103.

The rotation stage 111 carries the sample holder 112 and is also under control of the computer system 200. The rotation stage 111 has a control and data interface 30 that receives control signals/commands from the computer system 200.

When the optical angle modulation system is implemented as AOM, or specifically SAW modulators, each SAW modulator 100 will have various components. These components include a substrate 120, which is possibly shared by multiple modulators, a light coupler 106, an interdigitated transducer (IDT) 110 and a waveguide 102. The IDT 110 and the waveguide 102 are typically formed on and in the substrate 120. Each SAW modulator 100 also has an input face 158 and an end face 170. The end face 170 is located on a side of the SAW modulator 100 opposite the input face 158.

The SAW modulator 100 is also rotatably held by the sample arm 22, in the illustrated example. Here, the SAW modulator 100 is attached to the actuator 81 at a point near the input face 158 of the SAW modulator 100 to perform functions of the scanning system in this embodiment. In this way, the end face 170 also faces the sample 114.

The SAW modulator controller 20 is also under control of the computer system 200. The SAW modulator controller 20 has a control and data interface 30 that receives control signals/commands from the computer system 200.

The camera 68 includes a detector system 60 and lens system 62. The detector system 60 and the lens system have control and data interfaces 30. In one example, the detector system 60 is a spatially resolved CMOS or CCD detector system.

The computer system 200 includes a central processing unit (CPU) 50, an operating system 52, applications, an input/output (I/O) interface 33, memory 88, and a controller card 12. The computer system 200 loads information from, and saves information to, a database 122 connected to the computer system 200.

The database 122 stores 3D maps of the surfaces of the sample 114. These 3D maps are also known as three dimensional contour or possibly volume datasets 90. The volume datasets 90 are generated by the computer system 200 in response to the scanning system scanning the sample 114.

Operators utilize the applications executing on the computer system 200 to configure and manage components in the system 10 and to execute scans of the sample 114. The applications include a scanning module 54, a controller module 56, and an image/signal processing module 58. The operating system 52 loads the applications into memory 88 and schedules the apps for execution by the CPU 50. The computer system 200 functions as a system controller and also processes the information from the camera 68 and the SAW modulator controller 20 to analyze the sample 114.

Operators generally interact with the system 10 using the applications. The operators use the applications to configure commands and set parameters within the commands. The commands, in turn, are typically included in lists of commands that specify high-level actions for the computer system 200 to carry out. The command lists 99, when executed by the CPU 50, manage and control the components in the system 10 and execute scans of the sample 114. The command lists 99 might provide the ability to calibrate individual components, and execute scans of the sample 114. In another example, the command lists 99 might provide the ability to execute scans of the sample using the different operational modes of the system 10. The command lists 99 are stored to and loaded from the memory 88.

The computer system 200 controls the components in the system and executes scans generally as follows. After the operator has specified one or more command lists 99 to execute, the operating system 52 schedules the command lists 99 for execution on the CPU 50. The CPU 50 sends information for implementing the commands in the command lists 99 to the controller card 12. The controller card 12 then creates control messages that include component-specific control signals for carrying out the commands. The controller card 12 sends the control messages to the I/O interface 33.

The I/O interface 33 receives the control messages, and routes the control messages to the proper component(s), in one implementation. In another implementation, the control messages are queued at the I/O interface 33, and the various components poll the I/O interface 33 for their respective control messages. The components extract the control signals from the control messages, and execute associated actions in response to the control signals.

FIG. 1 shows one way of implementing the scanning system. Here, the scanning system employs both mechanical and diffractive scanning modalities and includes the rotation stage 111. The rotation stage 111 carries the sample holder 112, and rotates the sample holder 112 relative to the one or more SAW modulators 100. The rotation of the rotation stage 111 might also be combined with extension of the stand arm 22 in lateral direction X2, and/or rotation of the stand arm 22 in direction Z2 relative to the vertical support arm 24.

There are other ways of implementing a scanning system, however. For example, in other embodiments, the scanning system moves the one or more SAW modulators 100 around the sample holder 112 (and thus around the sample 114). This would avoid the need for the sample rotation stage. This embodiment is useful when larger samples 112 are tested such as an automobile.

The system 10 also preferably has different operational modes. The modes include a triangulation, a backscatter intensity, and an interferometry mode. In all of the operational modes, the surface of the sample 114 is scanned by emitted light 150 from the SAW modulator 100. The SAW modulator 100 operates in a similar or "baseline" fashion during a scan in each of the operational modes, and may provide additional functionality based on the specific mode.

The SAW modulator controller 20 provides input light 101 and RF signals 130 to the SAW modulators 100. Depending on the operational mode of the system 10, the information that the SAW modulator controller 20 receives from the SAW modulators 100 might include returned light 150' and interference signals 142, in examples.

In general, the baseline level of operation of the SAW modulator 100 during a scan is as follows. Input light 101 is received at the coupler 106 and travels along the waveguide 102 towards the end face 170. The RF signals 130 are received at the IDT 110 and cause the IDT 110 to create at least one SAW 140 in the substrate 120. The SAW waveform 140 travels in the waveguide 102 along with the light 101 towards the end face 170. When the light signals 101 interact with the SAW waveform 140, light signals of a "leaky mode" of the waveguide 102 are diffracted out of the waveguide 102 and enter the substrate 120. These diffracted light signals are then transmitted out the end face 170 as the emitted light 150.

The triangulation mode of the system 10 generally operates as follows. During a scan, the emitted light 150 from the SAW modulator 100 or other optical angle modulation system impinges upon the surface of the sample 114 at different points. The diffusely reflected light 150" from the sample 114 at these points is received by the lens system 62 of the camera 68. The lens system 62 focuses and images the light onto the detector system 60. The detector system 60 creates an image representation, in pixels, of the reflected light. The detector system 60 then sends the image information via its control and data interface 30 to the I/O interface 33 of the computer system 200.

At the computer system 200, the I/O interface 33 indicates to the CPU 50 that the image information from the detector system 60 has been received. The CPU 50 then instructs the operating system 52 to schedule the image/signal processing module 58 for execution. In response, the image/signal processing module 58 performs three dimensional or possibly tomographic reconstruction to create the contour or volume datasets 90 of the sample 114.

The backscatter mode of the system 10 generally operates as follows. As in the triangulation mode, the emitted light 150 from the SAW modulator 100 or other optical angle modulation system impinges upon and is reflected by the sample 114. A portion of the light reflected off the sample 114 also travels back towards the end face 170 of the SAW modulator 100. Here, however, the SAW modulators 100 are configured/fabricated to additionally couple the light reflected off the sample 114 and back into the SAW modulators 100. The light reflected off the sample and coupled back into the SAW modulators 100 is also known as returned light 150'.

The SAW modulators 100 then couple this returned light 150' out of the SAW modulators 100 for detection by the system 10. In the illustrated example, the SAW modulators 100 detect and then send the returned light 150' to the SAW modulator controller 20 for additional processing. The intensity of the return light may have a local maximum when the light 150 is focused to a small spot on the surface of sample 114, and the focal spot can be located in three-dimensional space based on the RF frequency and chirp rate; therefore, a plurality of points on the surface of the sample 114 can be located in three-dimensional space in relation to the modulator 100 at each fixed modulator position, using diffractive scanning.

The interferometer mode of the system 10 generally operates as follows. As in the backscatter mode, the SAW modulators 100 or other optical angle modulation systems are configured/fabricated to couple the light reflected off the sample 114 (e.g. the returned light 150') back into the SAW modulators 100. Here, however, the SAW modulators 100 are additionally configured/fabricated to operate as interferometers.

In more detail, the SAW modulators 100 create a sample arm path and a reference arm path from the returned light 150'. The SAW modulators 100 then combine the sample arm path and the reference arm path to form interference signals 142.

If the system 10 can be set up such that the signal and reference arm paths have equal dispersion—i.e., equal variation of optical path length as a function of wavelength—based on either the material of the substrate 120 and/or diffraction, then traditional white-light interferometry can be used. In traditional white-light interferometry, broadband light is directed as the input light 101 into the SAW modulator 100, and bright and dark bands appear when the signal and reference arms are nearly equal.

Other techniques, including time-of-flight and frequency comb ranging are also possible in the non-dispersive case. On the other hand, if dispersion cannot be cancelled out, then instead the intensity of the returned light 150' at multiple wavelengths can be measured one at a time, in a manner analogous to swept-source optical coherence tomography. The signal-vs-reference interference phase can be identified as an oscillation in the intensity-vs-frequency signal, and the dispersive contribution to phase can be subtracted out, leaving a contribution related to surface morphology.

For any of these operational modes, unwanted motion between the SAW modulators 100 operating as a "sense head" and the sample 144 under test can be detected and compensated. In examples, the motion compensation can be accomplished either during postprocessing, or using a closed-loop model. In the closed-loop model, the position, angle, and/or focus of the light can be adjusted in response to motion, which could for example be measured using a different light modulator channel.

Figure 2:
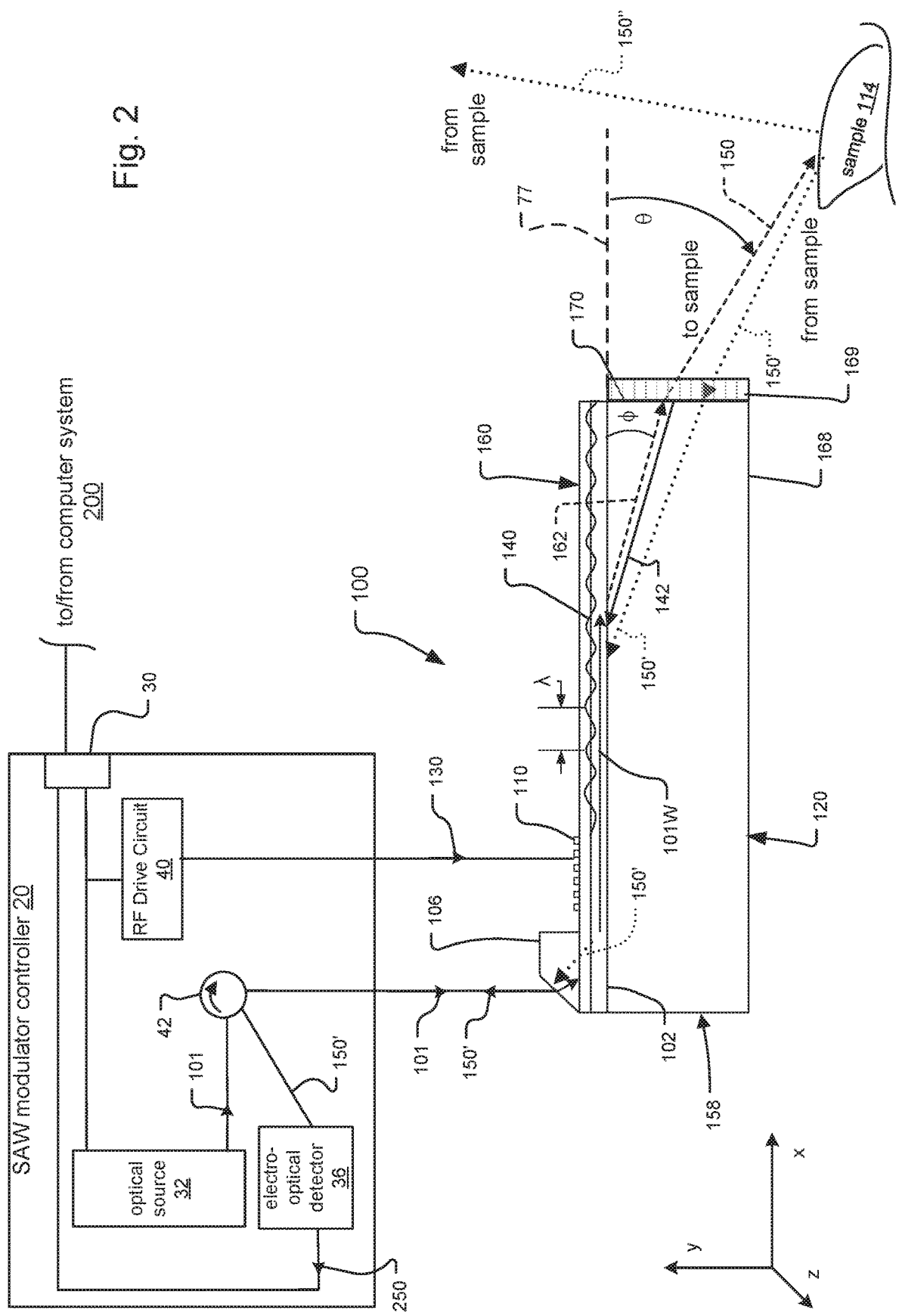
FIG. 2 is a schematic diagram showing detail for a SAW modulator and a SAW modulator controller of the system in FIG. 1, where operation of the SAW modulator and SAW modulator controller in both the backscatter intensity mode and the triangulation mode of the system are illustrated.

FIG. 2 shows detail for an exemplary SAW modulator 100 and SAW modulator controller 20 in the system 10 of FIG. 1. Here, operation of the SAW modulator 100 and the SAW modulator controller 20 in both the triangulation and backscatter intensity modes of the system 10 are illustrated.

Components of the SAW modulator controller 20 are shown. These components include a control and data interface 30, an optical source 32, an RF drive circuit 40, an optical circulator 42. In another implementation, the optical circulator 42 is replaced with a beam splitter.

An optical element 169 might also be formed/placed at the end face 170, as shown in the figure. The optical element 169 could be diffractive or refractive in nature. In examples, the element 169 might be a holographic grating, a lens or array of lenses, or a transmissive grating. Such an optical element 169 can collimate the exit light 150 into a focused beam, in one example.

At the controller 20, the optical source 32 sends the input light 101 to the circulator 42, which in turn forwards the input light 101 to the coupler 106 of the SAW modulator 100. At the same time, the RF drive circuit 40 sends an RF signal 130 of a specific frequency to the IDT 110 of the SAW modulator 100.

Within the SAW modulator 100, the input light 101 is coupled into the waveguide 102 as wavelength light 101W. This wavelength light 101W is guided along the waveguide 102 towards the end face 170.

In response to the RF signals 130, the IDT 110 induces the SAW waveform 140 within the waveguide 102.

In operation, the guided light 101W in the waveguide 102 interacts with the SAW waveform 140. The result of this interaction is that a portion of the guided waveguide light 101W is diffracted and polarization-rotated, out of the guided mode and into a leaky mode of the waveguide 102 having a transverse magnetic (TM) polarization. The light then exits the waveguide 102 as leaky-mode or diffracted light 162. The diffracted light 162 enters the bulk substrate 120 at deflection angle φ, measured from grazing 77.

At some point this diffracted light 162 exits the substrate 120 at an exit face, which is possibly through the substrate's end face 170 (as shown). The exit light 150 is transmitted out the end face 170 at an exit angle of θ. The range of possible exit angles θ comprises the angular extent, or exit angle fan, of the exit light 150. In typical SAW modulators 100, the exit angle θ varies between about 0 to 40 degrees and is dependent on the SAW frequency (frequency of the RF drive signal 130) and the wavelength (frequency) of the guided light 101W.

In the triangulation mode, to enable detection of the light reflected off the sample 114, the camera 40 is placed at some distance away from the sample 114. The detector system 60 then detects the diffusively reflected light 150".

In the backscatter intensity mode, in contrast, the returned light 150' is coupled back into the SAW modulator 100 as follows. The returned light 150' impinges upon the end face 170 and is transmitted back into to the substrate 120 at substantially the same angle at which the returned light 150' impinged upon the end face 170.

Once within the substrate 120, the returned light 150' is coupled into the waveguide 102. In more detail, the returned light 150' travels towards the waveguide 102 and is coupled into the waveguide 102. The returned light 150' then travels in the waveguide 102 towards the input face 158. The returned light 150' in the waveguide 102 is then coupled out of the waveguide 102 by the input coupler 106 and sent to the SAW modulator controller 20.

At the SAW modulator controller 20, the optical circulator 42 receives the returned light 150' and forwards the light to the electro-optical detector 36. The electro-optical detector 36 detects and converts the returned light 150' to associated electrical signals 250. The electro-optical detector 36 then sends the electrical signals 250 to the control and data interface 30 of the controller 20.

The computer system 200 accesses the electrical signals 250 at the control and data interface 30 of the controller 20, and processes the electrical signals 250 to create the contour and/or volume datasets 90 of the sample 114. In more detail, at the computer system 200, the I/O interface 33 indicates to the CPU 50 that the electrical signals 250 from the SAW modulator controller 20 have been received. The CPU 50 then instructs the operating system 52 to schedule the image/signal processing module 58 for execution. In response, the image/signal processing module 58 performs 3D or tomographic reconstruction to create the contour or volume datasets 90 of the sample 114.

Figure 3:
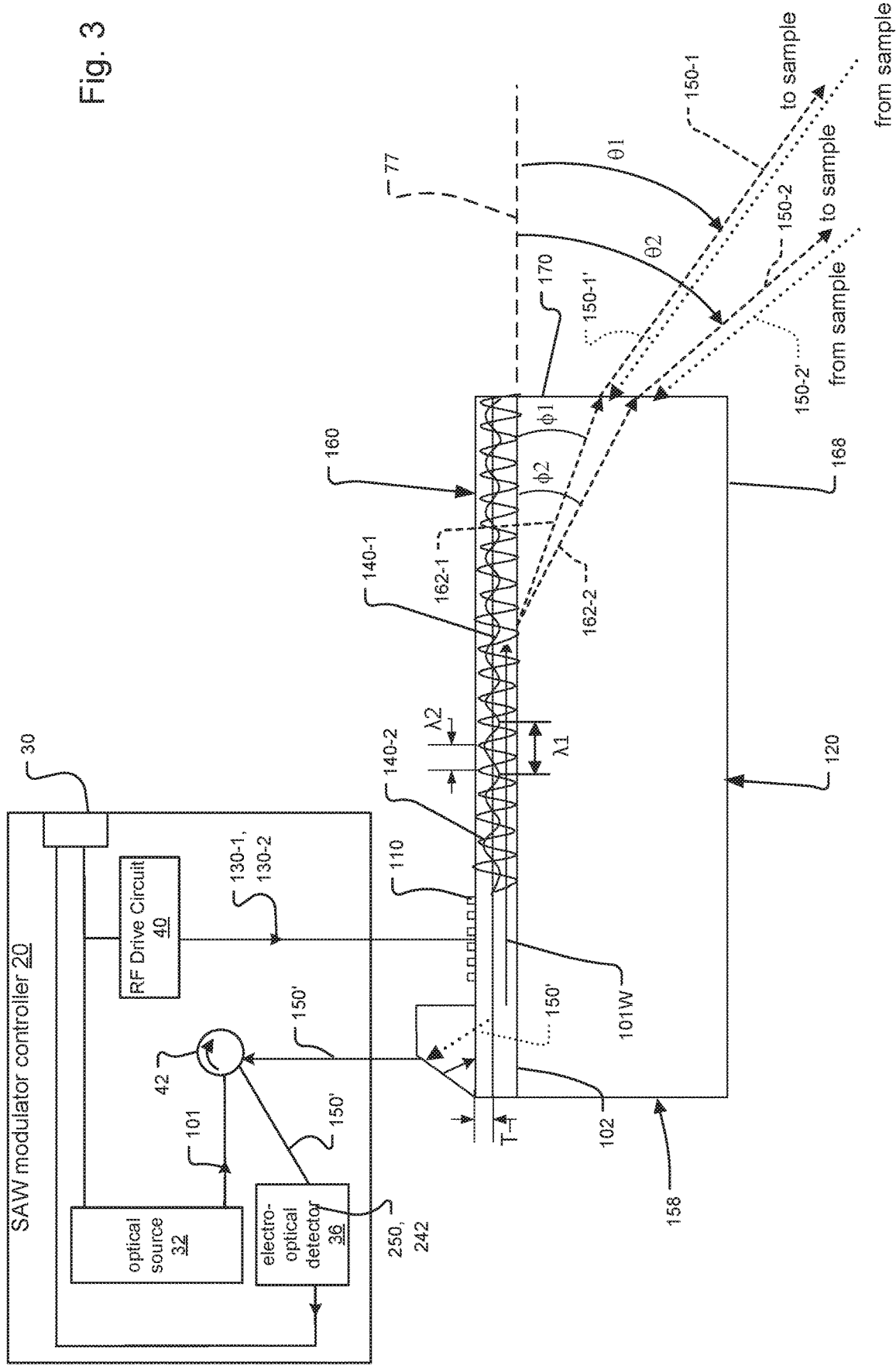
FIG. 3 is a schematic diagram that illustrates one example for how the SAW modulator in FIG. 2 might create structured light output.

FIG. 3 shows how the SAW modulator 100 or other optical angle modulation system might create structured light output. Such a capability is especially useful in the triangulation mode of the system 10.

Here, the input light signals 101 and/or RF signals 130 are typically configured such that the SAW modulator 100 operates as a structured light generator. In one implementation, the SAW modulator 100 operates as a structured light generator by providing exit light 150 in patterns that are not differentiated by wavelength. Here, the patterns might include patterns of black-and-white lines or squares or dots that are projected onto the sample 114 being profiled.

In this example, the system 10 might project a light pattern upon the sample (e.g. a tight grid of dots, narrow lines) and then detect the pattern. Using the various embodiments of the scanning system, the light pattern is "swept" across the sample during the scan. A perfectly flat, smooth surface would in theory reflect back a light pattern that matches the projected pattern. Differences between the original pattern and the detected pattern can be used to infer surface features. For this purpose, multiple SAW modulators 100 might be combined to operate as a 2-D projector.

In the illustrated example, phase-shifting interferometry might be implemented via the SAW modulator 100 to produce the projected light pattern of the exit light 150. This projected light pattern is a spatially varying multiple-cycle color spectrum, in one example.

In more detail, the controller sends light input 101 and two or more RF signals 130-1, 130-2 of different frequencies. The RF signals 130-1, 130-2 are sent as input to the IDT 110. Here, a chirped or composite IDT 120 is often used with multiple finger pitches. Such a configuration of the IDT 110 can excite a range of wavelengths of SAW waveforms 140. The range of SAW waveforms 140 are required to make a useful radiation shaping system, such as a holographic display system, from the exit light 150.

In the illustrated example, the RF signals 130-1, 130-2 drive the IDT 110 to produce a continuous-wave (CW) SAW waveform 140 having two components 140-1 and 140-2 at different frequencies f1, f2 (wavelengths $\lambda 1$, $\lambda 2$). The SAW waveforms 140-1 and 140-2 interact with the guided wavelength light 101W to produce diffracted light 162-1 and 162-2, at angles φ1 and φ2 with respect to grazing 77.

The diffracted light 162-1 and 162-2 impinge upon the end face 170 and are transmitted out of the SAW modulator 100 as exit light 150-1 and 150-2, respectively. The exit light 150-1 and 150-2 have angular extents θ1 and θ2, respectively.

The exit light 150-1 and 150-2 might overlap close to the end face 170 to create a pattern of interference stripes. The phase of these stripes changes with frequency $\Delta f \equiv (f1-f2)$, which may be too fast to easily measure (for example 100 MHz).

In another example, the input light 101 can also be strobed/modulated at another frequency f3. This will cause a visible phase change in the exit light 150-1 and 150-2 at a frequency (f3−Δf), which can be set to a much lower value such as 20 Hz to enable capture at different phases with readily-available image sensors.

Figure 4A:
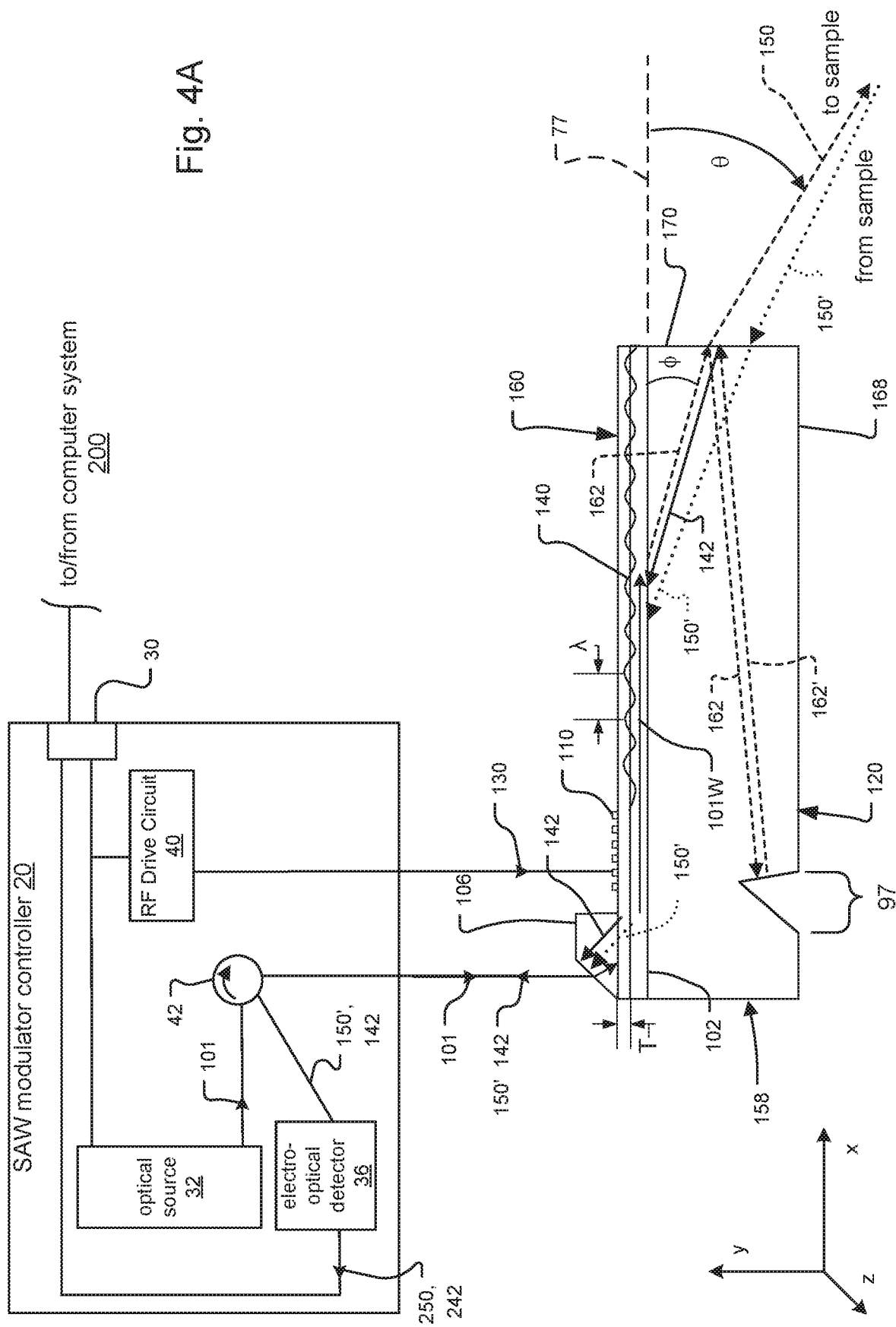

FIG. 4A shows detail for an exemplary SAW modulator 100 and SAW modulator controller 20 for use in the interferometry mode of the system 10 in FIG. 1.

As in the backscatter intensity mode, the SAW modulator 100 or other optical angle modulation system couples the returned light 150' at the end face 170 back into the substrate 120. Here, the SAW modulator 100 produces interference signals 142 based upon the returned light 150'.

A notch 97 or other reflector is fabricated in or on or adjacent to the substrate 120 that enables the SAW modulator 100 to additionally operate as an interferometer. Here, the notch 97 enables creation of a reference arm path of the interferometer. Additionally, the returned light 150' coupled back into the SAW modulator 100 forms a sample arm path of the interferometer.

The SAW modulator 100 operates as an interferometer as follows. During operation of the SAW modulator 100, not all of the diffracted light 162 is transmitted out of the end face 170 to form the exit light 150. Rather, some of the diffracted light 162 strikes the end face 170 and is reflected inwards. This inwardly reflected portion of the diffracted light 162, in turn, travels towards the input face 158 and reflects off the notch 97 as reflected diffracted light 162'. This reflected diffracted light 162' operates as the reference arm of the interferometer. At the end face 170, the reflected diffracted light 162' combines with the sample arm path formed by the returned light 150' to create an interference signal 142 at the end face 170.

The SAW modulator 100 then provides the interference signal 142 for detection by the SAW modulator controller 20. Here, the SAW modulator 100 couples the interference signals 142 into and out of the waveguide 102 in a similar way as the returned light 150'. The SAW modulator controller 20 also receives the interference signals 142 in a similar manner as the returned light 150', and converts the interference signals 142 to associated electrical interference signals 242 for consumption by the computer system 200.

The computer system 200 accesses the electrical interference signals 242 at the control and data interface 30 of the controller 20, and processes the electrical interference signals 242 to create the contour and/or volume datasets 90 of the sample 114.

FIG. 4B shows another example of a SAW modulator 100 constructed/configured to additionally operate as an interferometer. The SAW modulator 100 is used in the interferometry mode of the system 10 in FIG. 1.

Here, the substrate 120 at the distal face 168 enables creation of a reference arm path of the interferometer. As in FIG. 4A, the returned light 150' coupled back into the SAW modulator 100 forms a sample arm path of the interferometer, and the reflected diffracted light 162' operates as the reference arm of the interferometer. However, the interference signal 142 is formed from the returned light 150' and the reflected diffracted light 162' in a different manner.

In more detail, during operation of the SAW modulator 100, some of the diffracted light 162 strikes the end face 170 and is reflected inwards. This inwardly reflected portion of the diffracted light 162 travels downwards towards the distal face 158 and impinges at point A. After impinging upon point A, the light is reflected as reflected diffracted light 162' and travels substantially parallel to the diffracted light 162, towards the waveguide 102. At a substrate/waveguide boundary, the reflected diffracted light 162' combines with the sample arm path formed by the returned light 150' to create an interference signal 142. The SAW modulator 100 then provides the interference signal 142 for detection by the SAW modulator controller 20 in a similar fashion as in FIG. 4A.

Figure 5B:
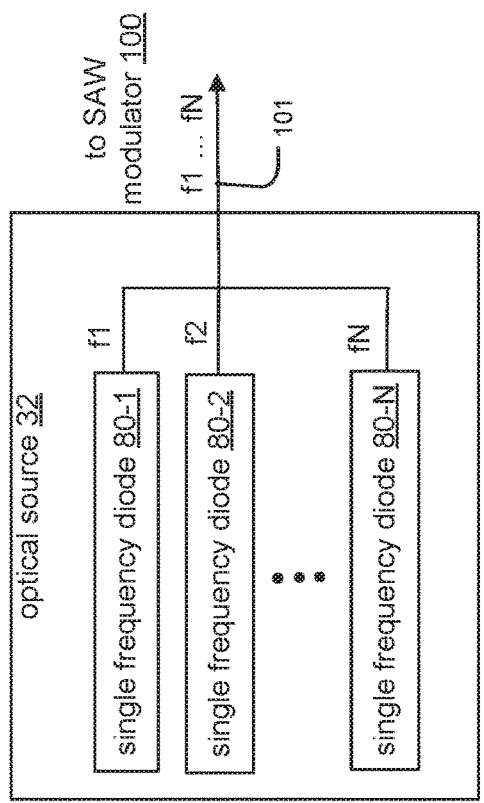
FIGS. 5A and 5B are block diagrams of different exemplary optical sources used to provide input light to the SAW modulators.
Figure 5A:
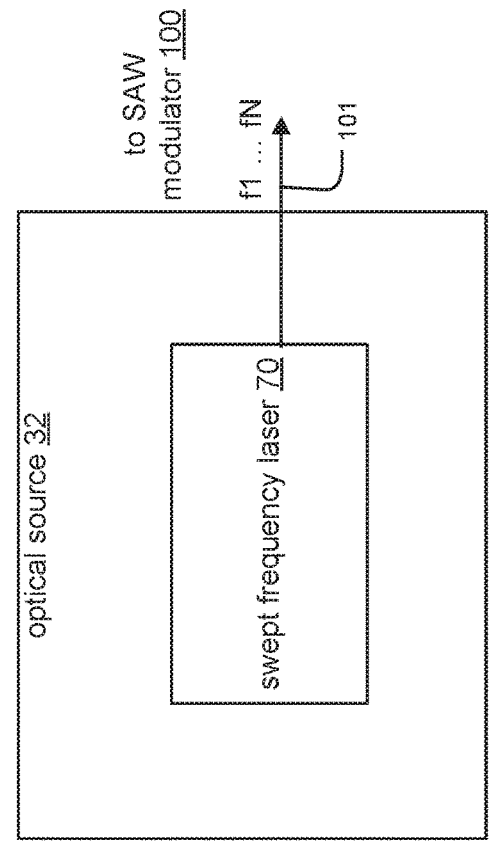

FIGS. 5A and 5B are block diagrams that show detail for an optical source of the SAW modulator controller.

In FIG. 5A, the optical source 20 is a swept frequency laser 70. The swept frequency laser 70 is configured to sweep the input light 101 across a range of frequencies f1 . . . fN. According to FIG. 5B, the optical source 20 includes individual single frequency diodes 80-1 . . . 80-N. Each of the diodes 80-1 . . . 80-N emit optical signals of fixed frequencies f1 . . . fN, which are combined to form the input light 101.

In general, if it is not possible to get every wavelength in phase simultaneously, multiple narrow-band measurements are still possible in sequence. The system sweeps wavelength over ideally >100 nm to get reasonable depth resolution (a few microns), and pulses the light at possibly 1 nanosecond for reasonable lateral resolution.

While this invention has been particularly shown and described with references to preferred embodiments thereof, it will be understood by those skilled in the art that various changes in form and details may be made therein without departing from the scope of the invention encompassed by the appended claims.

What is claimed is:
1. An optical analysis system, the system comprising:
  an optical angle modulation system for scanning light over an object;
  a computer system for mapping the object,
  wherein light from a reference arm path is mixed with the light returning from the object to form interference signals, which are detected with a detector.

2. The system of claim 1,
wherein the optical angle modulation system comprises one or more surface acoustic wave (SAW) modulators that emit light; and
wherein the system further comprises a mechanical scanning system that moves the optical angle modulation system relative to the object; and
wherein the computer system controls the mechanical scanning system.

3. The system of claim 2, wherein chirped RF pulses from a radio frequency drive circuit are applied to the SAW modulators to focus the emitted light into spots upon or around a surface of the object.

4. The system of claim 2, wherein the mechanical scanning system includes a rotation stage that carries the object, wherein the rotation stage rotates the object relative to the one or more surface acoustic wave (SAW) modulators.

5. The system of claim 2, wherein the mechanical scanning system translates the optical angle modulation system vertically and horizontally with respect to the object.

6. The system of claim 2, wherein each of the surface acoustic wave (SAW) modulators has a waveguide formed within a substrate, wherein the light coupled back into the SAW modulator is coupled into and then out of the waveguide by SAW waveforms within the waveguide, and then detected with a detector.

7. The system of claim 2, further comprising a camera that detects the light reflected by the object.

8. The system of claim 1, wherein the optical angle modulation system includes a waveguide, and wherein the interference signals are coupled into and then out of the waveguide and then detected with the detector.

9. The system of claim 1, further comprising an optical element at or near an exit face of the optical angle modulation system, the element being diffractive or refractive or holographic or arrayed.

10. A surface acoustic wave (SAW)-based interferometry system, the system comprising:
a SAW modulator that receives input light, emits some of the light via an exit face, and reflects some of the light inward at the exit face to form a reference arm path, wherein the SAW modulator receives reflected light that is coupled back into the SAW modulator to form a sample arm path.

* * * * *